(12) United States Patent
Fridén et al.

(10) Patent No.: US 6,697,874 B1
(45) Date of Patent: Feb. 24, 2004

(54) METHOD FOR CONTROLLING THE ACCESS, SUCH AS MEDIS ACCESS PROTOCOL, OF A PLURALITY OF TERMINAL ADAPTERS

(75) Inventors: Malte Fridén, Stockholm (SE); Lorens Almehag, Enskede (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/573,909

(22) Filed: May 18, 2000

Related U.S. Application Data

(63) Continuation of application No. PCT/SE98/02083, filed on Nov. 18, 1998.

(30) Foreign Application Priority Data

Nov. 18, 1997 (SE) ............................................. 9704228

(51) Int. Cl.⁷ ..................... G06F 15/173; G06F 15/16; H04J 3/02
(52) U.S. Cl. ..................... 709/240; 709/251; 370/462
(58) Field of Search ........................... 710/33; 709/201, 709/251; 370/462; 340/351; 714/2

(56) References Cited

U.S. PATENT DOCUMENTS

| | | | |
|---|---|---|---|
| 4,914,625 A | * 4/1990 | Billian | ............................ 714/2 |
| 5,050,164 A | 9/1991 | Chao et al. | |
| 5,079,763 A | 1/1992 | Chao et al. | |
| 5,084,871 A | * 1/1992 | Carn et al. | ................... 370/462 |
| 5,210,530 A | * 5/1993 | Kammerer et al. | ......... 340/3.51 |
| 5,870,566 A | * 2/1999 | Joh | ............................ 709/251 |
| 5,944,779 A | * 8/1999 | Blum | ......................... 709/201 |
| 5,991,831 A | * 11/1999 | Lee et al. | ...................... 710/33 |

FOREIGN PATENT DOCUMENTS

| | | |
|---|---|---|
| EP | 0448494 | 1/1991 |
| EP | 0559269 | 2/1993 |
| WO | 91/15909 | 10/1991 |

OTHER PUBLICATIONS

Tanenbaum, A. "Computer Networks," Sec. 4.3.5, Prentice–Hall (USA), 1996, ISBN–0–13–349945–6, pp. 301–303.

* cited by examiner

*Primary Examiner*—David Wiley
*Assistant Examiner*—Michael Delgado

(57) ABSTRACT

A customer premises network includes a plurality of terminal adapters, which are interconnected by a double daisy chained bus, preferably an optical fiber bus. One bus is used in each data transmission, i.e., one bus for downstream transmission of data and the other bus for upstream transmission of data. Interconnecting the terminal adapters to form a daisy chain means that the transmitted data is regenerated at each terminal adapter. The customer premises network is preferably a home network or a small company network. It may also interface an access network via a network interface.

25 Claims, 7 Drawing Sheets

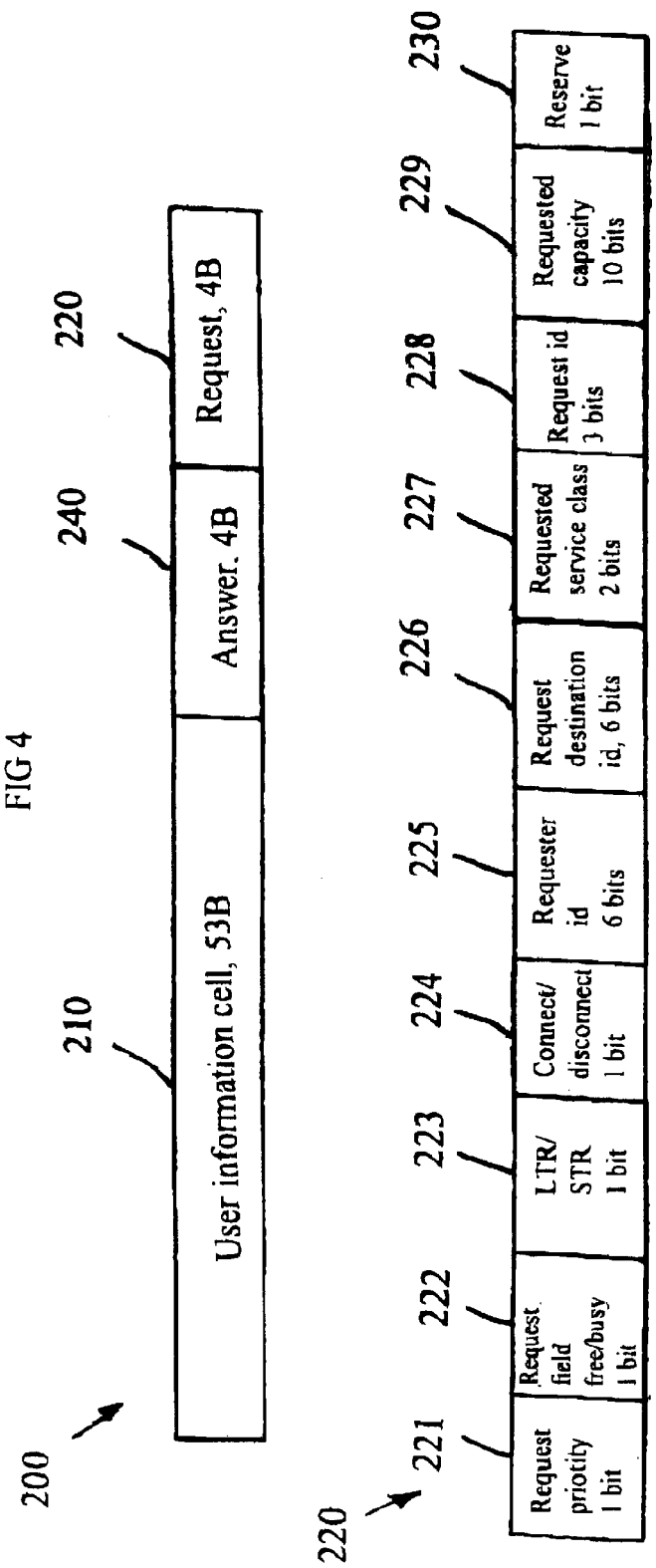

| 241 | 242 | 223 | 244 | 225 | 226 | 227 | 228 | 243 | 229 |
|---|---|---|---|---|---|---|---|---|---|
| Answer priority 1 bit | Answer field free/busy 1 bit | LTR/ STR 1 bit | Connected disc 1 bit | Requester id 6 bits | Request destination id. 6 bits | Requested service class 2 bits | Request id 3 bits | Request granted/ not granted 1 bit | Req. cap. 10 bits |

| 252 | 254 | 256 | 257 | 258 |
|---|---|---|---|---|
| Destination VPI, 6 bits | Source VPI, 6 bits | End user service 2 bits | LTR/ STR 1 bit | Not used 10 bits |

| 262 | 264 | 266 |
|---|---|---|
| Flow control 1 bit | Priority 2 bits | Free/ busy 1 bit |

METHOD FOR CONTROLLING THE ACCESS, SUCH AS MEDIS ACCESS PROTOCOL, OF A PLURALITY OF TERMINAL ADAPTERS

This is a continuation of PCT/SE98/02083, filed Nov. 18, 1998.

BACKGROUND

The present invention generally relates to a customer premises network, a customer premises system comprising such a network and a method for controlling the access to such a network. More specifically it relates to a home network based on ATM add/drop multiplexing and optical fibres.

In the system described in U.S. Pat. No. 5,050,164, there is described an optical customer premises network for interfacing user terminals with a broadband digital trunk and exchange network. Between the optical customer premises network and the broadband digital trunk and exchange network there is connected an optical network interface (ONI), which serves as a gateway and also provides access to certain centralised control functions. Each user terminal is associated with a respective terminal adapter, the terminal adapters being interconnected in such a way that the downstream information is dropped and the upstream information is transmitted by means of a "daisy chain", i.e. the upstream information is regenerated at each terminal adapter.

In U.S. Pat. No. 5,079,763, a divisional application of U.S. Pat. No. 5,050,164, there is described a customer premises network node access protocol for controlling the access of a plurality of terminal adapters to a bus for transmitting upstream information, the bus interconnecting the terminal adapters in a daisy chain. However, with these systems it is not possible to have a direct communication between the user terminals, since in both documents it is described that the transmissions between units of user terminals is only provided via the optical network interface (ONI).

EP-A2-0448494 relates to a DQDB network of nodes connected to each other with two data buses transmitting data in two opposite directions, upstream and downstream. Each node can transmit data to any other node of the network without passing the end nodes since each node can transmit on any of the two buses and address other nodes of the network. However, this document does not disclose interconnection of the terminal adapters in a "daisy chain". Moreover, it is not possible to add a terminal adapter without reconfiguring the network. It is an object of the present invention to overcome the disadvantages brought about with the above referenced prior art documents.

SUMMARY

This invention is embodied in a customer premises network, a customer premises network system and a related method for controlling the access of terminal adapters to the transmission means.

The customer premises network comprises at least two terminal adapters, each being connectable to a respective user terminal, a first and second transmission means which interconnects said terminal adapters to form a daisy chain for transmitting downstream and upstream information, respectively. The terminal adapter further comprises means for filtering particular information destined for the associated user terminal from a bit stream transmitted via the first or second transmission means; and means for writing particular information from the associated user terminal into a bit stream transmitted via the first or second transmission means, wherein a protocol handler handled by means of a media access protocol is also provided.

In a more detailed embodiment of the invention, each terminal adapter, comprises a respective predetermined address value (UPI) which is related to the position of the terminal adapter in the daisy chain.

In another more detailed embodiment of the invention, said protocol handler in a first end terminal adapter generates and forwards a clock signal to the first transmission means to synchronise the terminal adapters. This is conveniently accomplished by giving the first end terminal adapter the lowest predetermined address value (UPI).

A method for controlling access of the terminal adapters to the transmission means, a protocol, which is performed by a protocol handler located in each terminal adapter, basically supports the following:

determining if an incoming request is for said specific terminal adapter and if said specific terminal adapter (100,101,102) has a request to transmit, keeping track of the capacity of the outgoing first and second transmission means as a result of said determining steps, transmitting said request in said request direction or an answer in said answer direction determined as a result of said keeping track step.

An advantage of the invention is that the user terminals can communicate directly with each other independently of if a network interface is connected to the customer premises network or not.

In a preferred embodiment the customer premises network uses ATM to deliver all services and the information is transmitted on large core optical fibres. The preferred embodiment has the advantages of being cable lean, insensitive to electromagnetic radiation and capable of a relatively high bus bandwidth (>100 Mb/s).

BRIEF DESCRIPTION OF THE DRAWINGS

These and other objects, advantages and features of the present invention will be more readily understood from the following detailed description of the preferred embodiments thereof, when considered in conjunction with the drawings, in which like reference numerals indicate identical structures throughout the several views, and wherein:

FIG. 4 schematically illustrates a preferred embodiment of a packet for transmitting data and MAC information in a customer premises network.

FIG. 5 schematically illustrates a request field of the packet as illustrated in FIG. 4.

FIG. 6 schematically illustrates an answer field of the packet as illustrated in FIG. 4.

FIG. 7 schematically illustrates certain ATM cell header fields of a traffic cell for media access control purposes.

FIG. 8 schematically illustrates generic flow control (GFC) fields of a traffic cell for media access control purposes.

DETAILED DESCRIPTION

Figure 1:
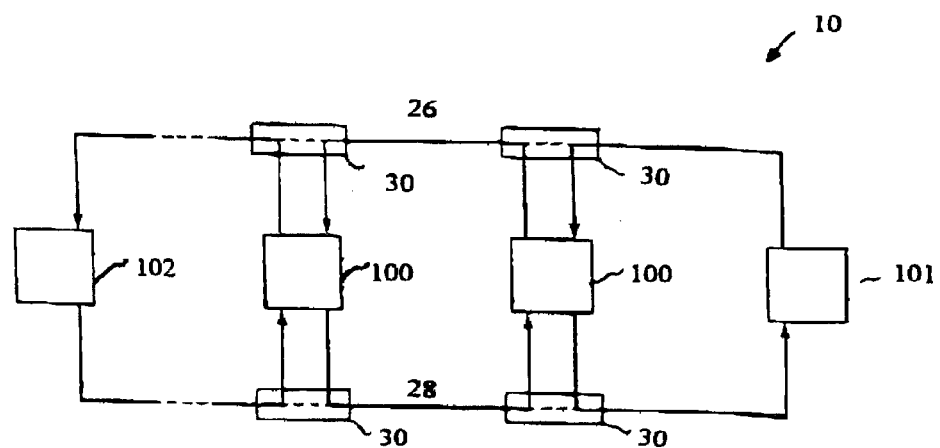
FIG. 1 schematically illustrates a customer premises network.

Referring now to FIG. 1, it illustrates a customer premises network 10 comprising four terminal adapters 100, 101, 102, which are interconnected by a double daisy chained optical fibre bus 26, 28, One fibre bus is used in each data transmission, i.e. one fibre bus 26 for downstream transmission of data and the other fibre bus 28 for upstream transmission of data. Interconnecting the terminal adapters 100, 101, 102 to form a daisy chain means that the transmitted data is regenerated at each terminal adapter. The customer premises network 10 is preferably a home network or a small company network.

Since the optical signals are regenerated in each terminal adapter, there is no direct transmission limitation to the number of terminals, as long as the maximum fibre length between the terminal adapters is not exceeded. Another advantage with the regenerative topology is that it allows direct communication between terminals.

The reason for using optical fibre is that it is easy to install, does not absorb or emit EM radiation, has a high bandwidth and is cheap.

Two fibre types can be considered for this application: plastic optic fibre (POF) and Hard Clad Silica fibre (HCS fibre). Due to the large core diameter of these fibres, the costs for connectors and optoelectronic components can be kept low. The POF has much higher attenuation than the HCS fibre, but is to prefer for very short distances (<50 m) since it couples more light than the HCS fibre.

Furthermore, since it should be possible to remove a terminal adapter without disrupting the rest of the home network, there is preferably included an Optical Protection Switch (OPS) 30 in each fibre bus wall outlet. In FIG. 1, each terminal adapter 100, 101, 102 is connected to two simplex switches 30. In practice, the OPS 30 will be one duplex unit which by-passes the downstream and upstream optical signals when the four-fibre terminal adapter cable connector is detached therefrom. U.S. Pat. No. 5,050,164 and U.S. Pat. No. 5,079,763 describes an optical protection switch, which may be used.

Of the four terminal adapters 100, 101, 102 shown in FIG. 1, two are considered to be end terminal adapters 101, 102, i.e. a first end terminal 101 and a second end terminal 102, meaning that they are at the end of the daisy chain. Since they are at the end, only two of the four optical fibres of the four-fibre terminal adapter cable connector are used. The end terminal adapters 101, 102 have certain master functions: The first end terminal adapter 101 and the second end terminal adapter 102 each provide an idle cell stream to be used for the downstream and upstream data flow respectively. Furthermore, the first end terminal adapter 101 generates a clock signal which is transmitted downstream with the bit stream to each terminal adapter 100, 102, such that they work in synchrony. When the clock signal arrives at the second end terminal adapter 102 via the downstream bus 26, it extracts the clock signal and transfers it to the upstream bus 28. Of course any terminal adapter 100, 101, 102 may perform the functions of the first and second end terminal adapters 101, 102, since each terminal adapter 100, 101, 102 comprises the means for performing the master functions. Consequently, a master does not have to be at the end of the daisy chain.

Figure 2:
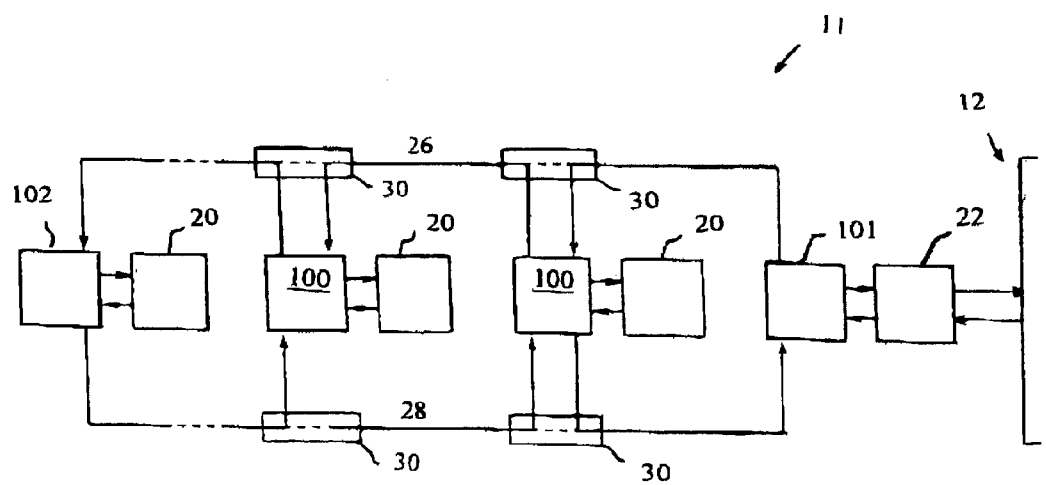
FIG. 2 schematically illustrates a customer premises network connected to user terminals and a network interface.

FIG. 2 illustrates a customer premises network system 11 whereby a user terminal 20, 22 is connected to each terminal adapter 100, 101, 102 in a customer premises network 10. The customer premises network system may either be an independent system or connected to an access network 12 as illustrated in FIG. 2. The access network connects the home or small office with the nearest switching node. If the network system 11 is connected to an access network 12, it is connected thereto by means of a network interface 22, e.g. a network terminal NT, which is adapted to receive and transmit information to and from the access network 12. The terminal adapter to which the network interface 22 is connected is then normally designated as first end terminal adapter 101 and master. The user terminals 22 connected to the first end terminal adapters 101, 102 is called first end user terminal 22.

A network interface 22, or a network terminal NT 22, can be considered as a specialised terminal that can be connected to an access network 12. The network interface 22 serves as a gateway and also provides access to certain centralised control functions, e.g. it forwards the access network clock signal to the terminal adapters via the downstream data flow. Consequently, when the customer premises network system 11 is connected to an access network 12, the customer premises network system 11 locks on to a clock signal from the access network 12 via the network interface 22. The master 101 then uses the clock signal from the network interface 22.

If the customer premises network system 11 configuration is changed, e.g. a user terminal 20, 22 is removed from a terminal adapter 100, 101, 102 performing the master functions, the master assignments can be given to any other terminal adapter 100, 101, 102 This is handled by the protocol handler 155 by means of a media access control (MAC) protocol which will be explained below.

The data on the optical fibre bus is carried in ATM cells. The speed of the link between the terminal adapters 100, 101, 102 and the user terminals 20, 22 can be lower than the bus speed. In order to save hardware, the terminal adapters 100, 101, 102 may be integrated within the user terminals 20, 22, thus eliminating the need for a serial transmission link between these.

Figure 3:
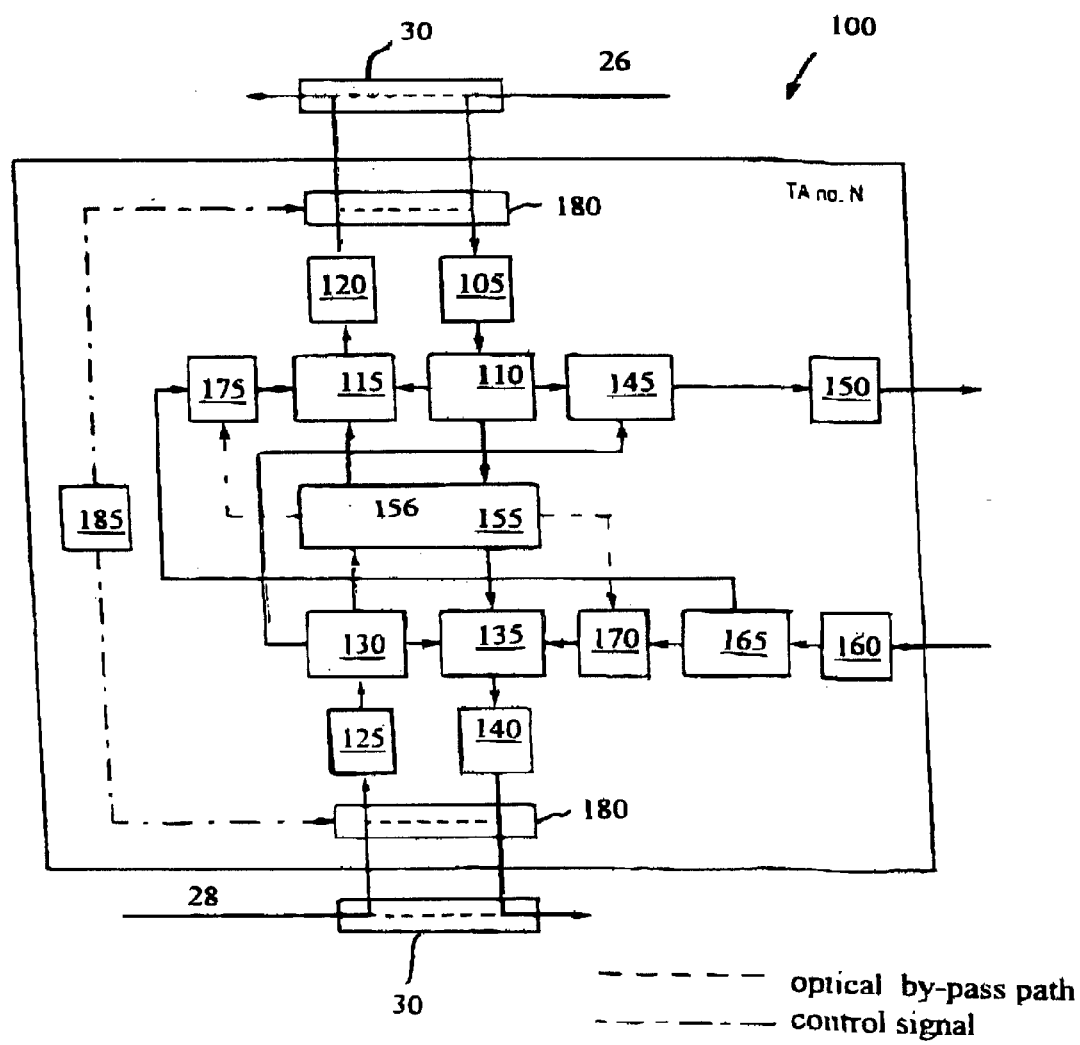
FIG. 3 schematically illustrates a terminal adapter for use in connection with the customer premises network.

FIG. 3 illustrates a preferred embodiment of a terminal adapter 100, 101, 102 comprising the following main blocks:

A. Bus transmitters and receivers (105, 125, 120, 140)
B. Terminal transmitter and receiver (150, 160)
C. Optical relay (OR), with control (180, 185)
D. Terminal adapter core (110, 115, 130,135, 145,155, 165,170,175)

The main blocks A–D are briefly described below.

A. Optical Fibre Bus Transmitters and Receivers

This block comprises optoelectronic transmitter and receivers suitable for large core optical fibre. Also transmission framing circuitry (or only a serial to parallel converter) and clock recovery may be included. The bus transmission speed is in the order of 100 Mb/s or higher.

B. Terminal Transmitter and Receiver

This block comprises a transmitter and receiver for the electrical or optical transmission between the terminal adapter 100, 101, 102 and the user terminal 20, 22. Also transmission framing circuitry (or only a serial to parallel converter) and clock recovery may be included. The transmission speed can be equal to or less than the bus transmission speed. If the terminal adapter 100, 101, 102 is included in the user terminal 20, 22, the data can be transmitted on parallel form, and the block can be eliminated.

C. Optical Relay

In order to prevent that the daisy-chain is broken in case of power failure in a terminal adapter, optical relays are preferably included in the terminal adapters. The optical relays 180 by-pass the optical upstream and downstream signals in case of power failure in the terminal adapter 100, 101, 102. If no voltage is present, the relay-control 185 detects this and sets the optical relays 180 in a by-pass mode. The optical relays 180 can be two simplex relays or one duplex relay.

In the case where an optical protection switch (OPS) according to U.S. Pat. No. 5,050,164 or U.S. Pat. No. 5,079,763 is used, optical relays 180 within the terminal adapters as described above are not needed, since the optical protection switch defined in the US documents already includes their function.

D. Terminal Adapter Core

This block includes means for directing ATM cells to the optical fibre bus 26, 28 or to a user terminal 20, 22, the means comprising ATM demultiplexers 110, 130, 165; ATM multiplexers 115, 135, 145; and a media access protocol handler 155;. The address information needed for directing the ATM cells to the optical fibre bus 26, 28 or to a user terminal 20, 22, is carried in the ATM cell header. The terminal adapter core is also able to buffer ATM cells (if needed) by means of buffering means 170, 175, before the ATM cells are sent to the optical fibre bus 26, 28. This is controlled by known methods by the protocol handler 155. The buffering is preferably made differently for different data service classes, e.g. isochronous and asynchronous services. The protocol handler 155 also sends information about the current cell rate needed to the optical fibre bus 26, 28. If a terminal adapter 100, 101, 102 is assigned to be a master, generation of an idle cell stream for the downstream or upstream transmission is performed by the protocol handler 155.

Possible paths for data and control signals through the tern adapter 100, 101, 102, may for example be the following:

- ATM cells on the downstream bus 26 to be forwarded to the next downstream terminal adapter are received by receiver Rx 105, identified by ATM demultiplexer 110, and sent via ATM multiplexer 115 to transmitter Tx 120. The identification by a ATM demultiplexer is performed by reading the ATM cell header, which is well known in the art;
- ATM cells on the upstream bus 28 to be forwarded to the next upstream terminal adapter are received by receiver Rx 125, identified by ATM demuitiplexer 130, and sent via ATM multiplexer 135 to transmitter Tx 140;
- ATM cells dropped from the downstream bus 26 to the terminal adapter for transmission to the user terminal 20, 22 are received by receiver Rx 105, identified by ATM demultiplexer 110, and sent via ATM multiplexer 145 to transmitter Tx 150;
- ATM cells to be dropped from the upstream bus 28 to the terminal adapter for transmission to the user terminal 20, 22 are received by receiver Rx 125, identified by ATM demultiplexer 130, and sent via ATM multiplexer 145 to transmitter Tx 150;
- control signals to be dropped from the downstream bus 26 for transmission to the protocol handler 155 are received by receiver Rx 105, identified by ATM demultiplexer 110, and sent to the protocol handler 155;
- control signals to be dropped from the upstream bus 28 for transmission to the protocol handler 155 are received by receiver Rx 125, identified by ATM demultiplexer 130, and sent to the protocol handler 155;
- ATM cells from the user terminal 20, 22 to be added on the downstream bus 26 are received by the receiver R 160, identified by the ATM demultiplexer 165, and sent via the buffer means 175 and the ATM multiplexer 115 to the transmitter Tx 120;
- ATM cells from the user terminal 20, 22 to be added on the upstream bus 28 are received by the receiver Rx 160, identified by the ATM demultiplexer 165, and sent via the buffer means 170 and the ATM multiplexer 135 to the transmitter Tx 140;
- control signals from the protocol handler 155 to be added on the downstream bus 26 are generated by the protocol handler 155, received by the ATM multiplexer 115 and sent to the transmitter Tx 120;
- control signals from the protocol handler 155 to be added on the upstream bus 28 are generated by the protocol handler 155, received by the ATM multiplexer 135 and sent to the transmitter Tx 140;

In the following description, it will now be explained how the MAC protocol works according to a preferred embodiment of the invention. MAC protocols are always a compromise between fairness, efficiency and complexity. There are many definitions of what "fairness" is. Complexity has an influence on terminal cost and tune to market. The cost of efficiency has to be balanced against the cost of transmission.

A special factor concerning home networks is that the network terminal NT 22, needs a much higher bandwidth in the downstream direction than any other user terminal 20 in any other direction. A similar situation in a MAN or WAN is a server connected to it.

As long as there is no shortage of resources, every user terminal 20, 22 and every priority grade gets what it wants. When the customer premises network system becomes heavily loaded, steps must be taken to distribute the available resources in a fair way and to maintain a stable system.

One way to administer resources on heavily loaded shared media is to use reservations. Preferably, reservations are always used, but the reservations are of two different types. What is reserved is not a special channel but a resource. The two types of reservations are Long Time Reservation (LTR) signals which require special disconnection signals and Short Time Reservation (STR) signals which do not require special disconnection signals. LTR signals are used for long time Constant Bit Rate (CBR) reservations like telephony, TV and CD-player signals feeding an amplifier. When used, these connections do not load the system with MAC signalling. STR is typically used for burst type traffic, e.g. IP data from a PC.

The LTR process consists of two phases, a request/disconnect phase and a traffic phase. The request/disconnect phase comprises the steps of setting up a resource (the connect step) by using requests and answers and ending a resource (the disconnect step). The traffic phase relates to sending user information when a resource has been set up.

All traffic in the home network use reservations (R). Request and answer information could be carried either as special cells or as packets comprising add on fields added to an ATM cell. The latter method is preferred because It leads to a faster and a more evenly distributed request/answer process.

As illustrated in FIG. 4, a packet 200 going in the request direction (RD) and in the answer direction (AD) of the daisy chain consist of three parts; the user information cell 210, the request field 220 and the answer field 240. The packet 200 preferably comprises a total of 61 bytes, whereby the user information cell 210 comprises 53 bytes, the request field 220 4 bytes and the answer field 240 4 bytes. The request and answer fields 220, 240 do not have anything to do with the user information cell 210, e.g. the ATM cell. Any terminal adapter 100, 101, 102 is free to use the request and answer fields 220, 240 according to certain miles, which will be explained below.

As illustrated in FIG. 5, the request field 220 comprises a request priority field of 1 bit 221, a request field free/busy of 1 bit 222, a LTR/STR field of 1 bit 223, a connect/disconnect field of 1 bit 224, a requester id field of 6 bits 225, a request destination id field of 6 bits 226, a requested service class field of 2 bits 227, a request id field of 3 bits 228, a requested capacity field of 10 bits 229, and a 1 bit reserve field 230.

The priority is in principle a combination of CTD and CDV. The request priority fields 221,241 are relevant in the STR case. In the LTR case, every request has the lowest priority. Priority in the request field 221 and answer field 241 have two values and can be seen as a further finer division of LTR/STR. Consequently, there are a total of four priorities, one for each of die four traffic priorities in the GFC priority field 264.

The request id 228 is needed when a terminal adapter. 100, 101, 102 has several requests simultaneously. The request capacity in the request capacity field 229 is a calculated value. The calculated value is chosen such that the request capacity is optimised for the link.

As illustrated in FIG. 6, the answer field 240 comprises an answer priority field of 1 bit 241, a answer field free/busy of 1 bit 242, a LTR/STR field of 1 bit 223, a connected/disconnected field of 1 bit 224, a requester id field of 6 bits 225, a request destination id field of 6 bits 226, a requested service class field of 2 bits 227, a request id field of 3 bits 228, a request granted /not granted field of 1 bit 243, and a requested capacity field of 10 bits 229.

The answer field 240 is very similar to the request field 220. However, they differ on certain points. The connect/disconnect field 224 in the request field 220 is used by a terminal adapter 100, 101, 102 for requesting to set UP or end a connection to another terminal adapter 100, 101, 102, whilst the connected/disconnected field 244 in the answer field 240 is used for informing of a connection or disconnection. The request granted/not granted field 243 is differs also. The requested capacity field 229 is needed to decrease a counter 156, which is comprised in each terminal adapter 100, 101, 102, and preferably managed by the protocol handler 155 of each terminal adapter 100, 101, 102 effected by a "not granted answer". Of course, the request and the answer fields 220, 240 need not share certain fields as suggested by the reference signs, but may be totally separated entities.

FIGS. 7 and 8 illustrate certain fields which are found in the header of the user information cell 210, e.g. an ATM cell, which are used for media access control (MAC) purposes. FIG. 7 illustrate the ATM cell header fields which are used for determining the destination 252 for a request 220 comprising 6 bits and the source 256 of the request 220 comprising 6 bits, thus making it possible to return an answer 240 to the requester. These fields define a VPI address. The ATM header field 250 further comprises an end user service field 256 of 2 bits which may be used for distinguishing between end user signals, e.g. an MPEG stream and a control stream. The ATM header field 250 may also comprise an STR/LTR field 257 of 1 bit which is used for decreasing a counter 156 when a request is not granted. There is also a not used field of 10 bits in accordance with the ATM protocol. When a terminal adapter 100, 101, 102 has been granted a resource, it can use the capacity that it asked for. Since the terminal adapter 100, 101, 102 was granted a resource, not a special cell, there must be a priority mechanism for the user information cells. For this means, the header of the user information cell 210 further comprises Generic Flow Control (GFC) fields 260 which are used by the protocol handlers 155 of the terminal adapters 100, 101, 102. The GFC fields 260 comprises a flow control field 262 of 1 bit which is not needed for occupying a user information cell 210, a priority field 264 of 2 bits and a free/busy field of 1 bit for flow control of the user information cells, priority status of the user information and if the user information cells 210 contain user information or not respectively.

Regarding the priority of the user information as marked in the GFC priority field 264, there are four types of priority for categorising the different ATM quality of service classes: 00 is given to delay sensitive CBR; 01 is given to not very delay sensitive CBR; 10 is used as a reserve; and 11 is given to UBR. The remaining ATM quality of service classes rt-VBR, nrt-VBR and ABR are also allocated one of the above priority types. In the case of ABR, the reserve 10 may have to be used. The 00 priority is e.g. used for POTS and maybe video conferencing. The 01 priority is typically used for CBR video.

Figure 9:
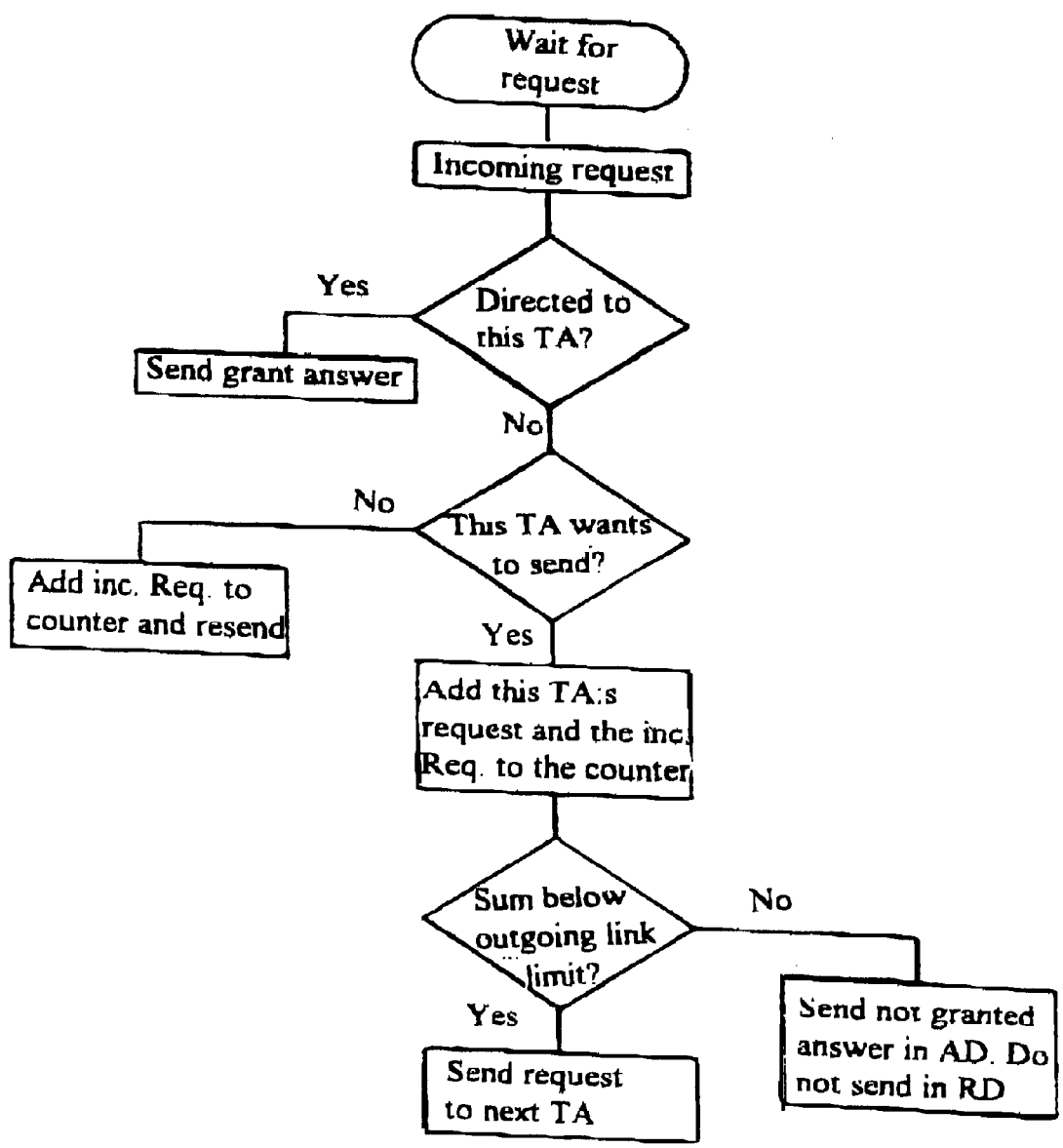
FIG. 9 schematically illustrates a flow diagram for handling an incoming request in a terminal adapter according to a preferred embodiment of the invention.

FIG. 9 illustrates a flow diagram for handling an incoming request in a terminal adapter. Referring more generally to FIG. 9, each terminal adapter 100, 101, 102 has a counter 156, which is handled by the protocol handler 155, and which counts the accumulated traffic from this terminal adapter 100, 101, 102 and the terminal adapters 100, 101, 102 preceding this one. The counter is increased by the value which is found in the request capacity field 229. If the counter value exceeds the request capacity of the link going from this terminal adapter 100, 101, 102, an answer is sent in the answer direction (AD) from this terminal adapter 100, 101, 102 and contains a "request not granted" flag and the request is not further forwarded, i.e. the request is not forwarded to its requested destination. Since terminal adapters 100, 101, 102 preceding this terminal adapter 100, 101, 102 has increased their counter value, they must decrease them again if there is a "request not granted" message in the corresponding field 243 going in the opposite direction. It does so with the help of the requested capacity field 229 in the answer field 240. It is the same value that was used in the request capacity field 229 in the request field 220.

If the counter value does not exceed the capacity of the outgoing link, the request is forwarded to the next teal adapter 100, 101, 102, and so on until it reaches its destination. The counter in the terminal adapter 100, 101, 102 is increased with the value of the request. In this case, the terminal adapter 100, 101, 102 being the destination for the request sends a grant answer to the requester.

When a terminal adapter 100, 101, 102 receives a packet 200 comprising a request not granted 243, the terminal adapter 100, 101, 102 has to decrease its counter 156. Depending on if the reservation requested is a LTR or a STR, which is determined by the LTR/STR field 223, the counter 156 is decreased differently. For LTR:s, it is decreased by the amount in the request capacity field 229 in a disconnect signal, i.e. a request field 220 whereby "disconnect" in the connect/disconnect field 224 is activated. For STR:s, it is decreased by the passing STR cells, an STR cell being a user information cell 210 of STR type, i.e. a user information cell 210 which does not need a special disconnect signal by means of the STR/LTR field 257, or by the value in the requested capacity field 229 in a request not granted 243.

When decreased by the answer field 240 in a passing packet 200, the counter value in the request capacity field 229 has to be recalculated in those cases where the priority is taken into account.

Referring more specifically to FIG. 9, a specific terminal adapter 100, 101, 102, which we will call TA, receives an incoming request and determines if it is directed this TA. If the answer is yes, the TA sends a request granted 243 in a free answer field 240, 242 to the requester. If the answer is no, the TA determines if it wants to transmit a request of its own. If the TA has no request of its own to transmit, it adds the incoming request to its counter and retransmits the request to the next terminal adapter 100, 101, 102. If the answer is yes, the TA adds the incoming request and the request of its own to its counter and determines if the sum in the counter is below the limit of the outgoing link, i.e. within the capacity of the outgoing link. If the answer is yes the incoming request is retransmitted to the next terminal adapter 100, 101, 102. However, if the answer is no, the TA sends a request not granted 243 in a free answer field 240, 242 in the answer direction AD and do therefore not retransmit the incoming request to the next terminal adapter 100, 101, 102.

Figure 10:
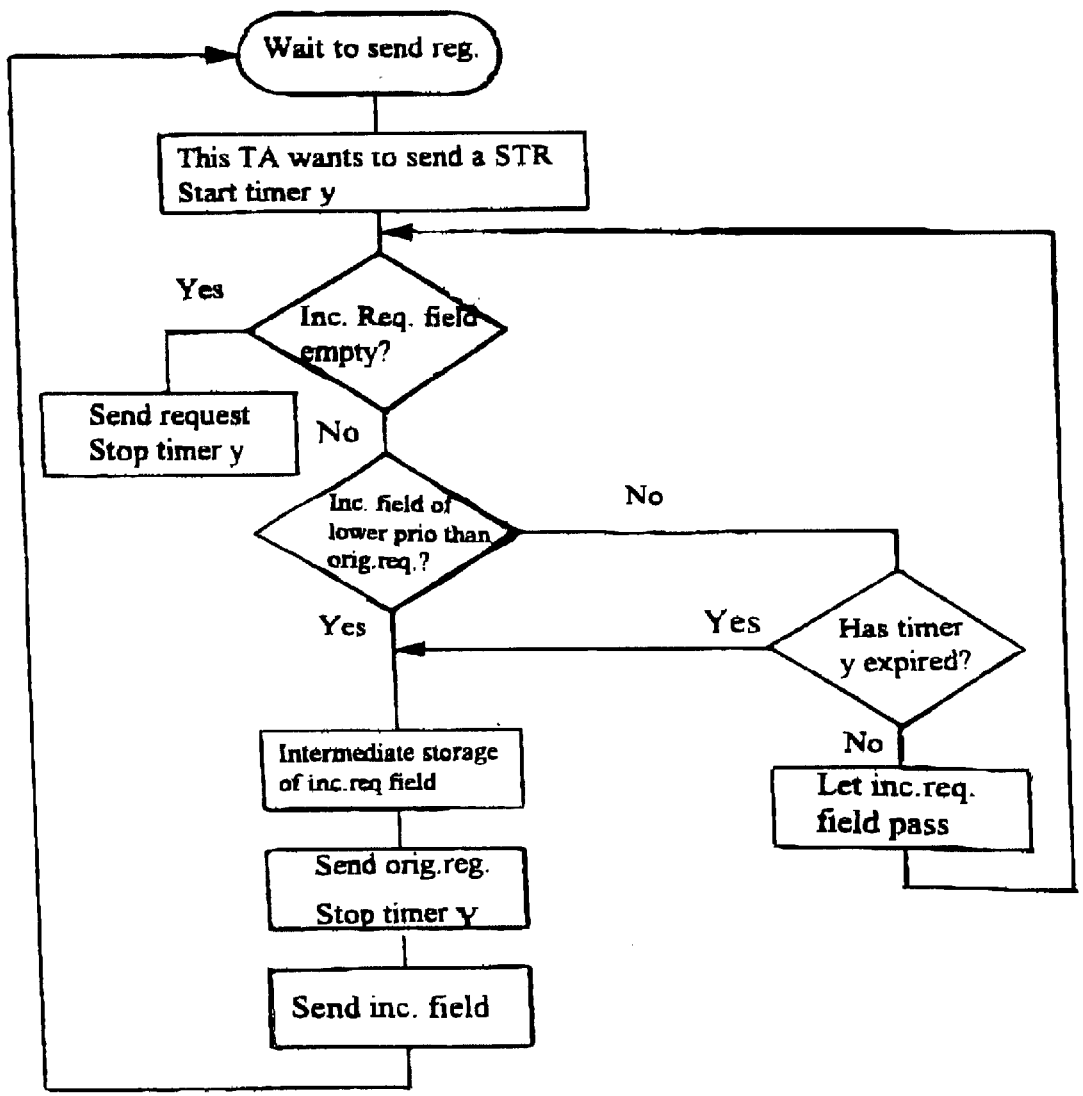
FIG. 10 schematically illustrates a flow diagram for a terminal adapter to transmit a request of its own according to a preferred embodiment of the invention.

FIG. 10 illustrates a flow diagram when a specific terminal adapter 100, 101, 102, which we will call TA, wishes to transmit a request. In this example the request is for a short time reservation STR. Referring more specifically to FIG. 10, this TA has a request, which we will call REQ, to transmit and starts a timer y (not shown). Such a timer y is comprised by each terminal adapter 100, 101, 102 and it runs for a predetermined interval of time. The predetermined interval is chosen so that the traffic situation in the customer premises network system 11 is the most optimal. When the TA receives the next packet 200, the TA determines if the incoming request field 220 is empty. If the answer is yes, the TA transmits its request REQ and stops the timer y. If the answer is no, the TA determines if tile incoming request 220 has a lower priority, i.e. request priority 221 and LTR/STR 223, than the request REQ. If the answer is no, the TA determines if the timer y has expired and if the answer is no, the TA retransmits the incoming request to the next terminal adapter 100, 101, 102 and waits for the next incoming request. If however, the timer y has expired after the priority check, the request REQ is treated as if it has higher priority than the incoming request. If the request REQ has a higher priority than the incoming request, the TA performs an intermediate storage of the incoming request field 220, transmits its request REQ and stops the timer y. It thereafter transmits the request field which is in intermediate storage. Finally, the TA waits for the next request REQ to transmit.

The main differences between LTR and STR is that the LTR timer x has a longer predetermined time interval than the STR timer y. The LTR traffic and the LTR requests have a lower priority than in the STR case and the LTR reservations have to have a special disconnect signal to end a reservation.

Figure 11:
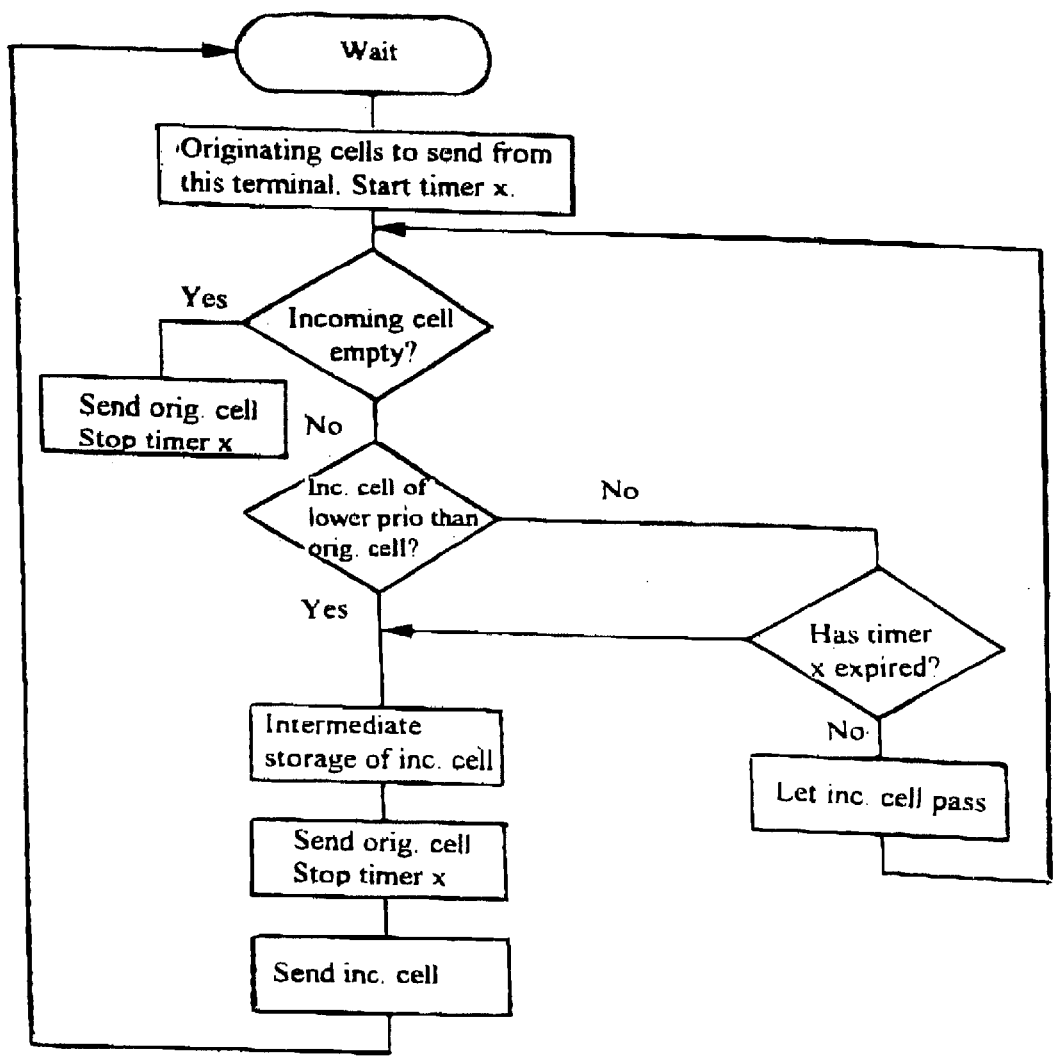
FIG. 11 schematically illustrated a flow diagram for transmitting user information between terminal adapters according to a preferred embodiment of the invention.

FIG. 11 illustrates a flow diagram for transmitting user information in packets 200 between terminal adapters 100, 101, 102. The principle of occupying a cell is quite simple. Regarding user information, each type of user information is allocated a priority marking in accordance with the priority field 264 of the GFC field 260 as explained above. Referring generally to FIG. 11, when a cell arrives at a specific terminal adapter 100, 101, 102, which we will call TA, and the TA has nothing to send it just passes the cell. If the TA has something to send, it analyses the incoming cell. If it is empty it fills the cell. If the cell is occupied, the terminal looks at the priority of the content of the incoming cell. If the priority of the content is lower than that of the cell waiting, the TA stores the content of the incoming cell and puts its own content in the cell. If the priority is the same one, the cell is retransmitted. The intermediate storing buffer has a depth of 1 cell. In order to make this simple protocol somewhat fairer to the terminal adapters that are last in the chain, there is an exception from the rule of letting cells of the same priority pass. If the cell from the TA has waited for more than a predetermined time interval in microseconds, it will replace the incoming one, even if it is of the same priority. The time interval is chosen such that the traffic in the link is optimised.

Referring more specifically to FIG. 11, this TA has user information to send, which we will call INFO, and starts a timer x (not shown). Such a timer x is comprised by each terminal adapter 100, 101, 102 and it runs for a predetermined interval of time. The predetermined interval is chosen so that the traffic situation in the customer premises network system 11 is the most fair. When the TA receives the next packet 200, the TA determines if the incoming user information field 210 is empty. If the answer is yes, the TA transmits its information INFO and stops the timer x. If the answer is no, the TA determines if the incoming information 210 has a lower priority than the information INFO. If the answer is no, the TA determines if the timer x has expired and if the answer is no, the TA retransmits the incoming information 210 to the next terminal adapter 100, 101, 102 and waits for the next incoming packet. If however, the timer x has expired after the priority check, the information INFO is treated as if it has higher priority than the incoming information. If the information INFO has a higher priority than the incoming information, the TA performs an intermediate storage of the incoming information field 210, transmits its information INFO and stops the timer x. It thereafter transmits the information field which is in intermediate storage. Finally, the TA waits for the next information INFO to transmit.

Data communication between the customer premises network system 11 and an access network should be supported even if the bit rate could be as low as 2 Mb/s in the access network. An example could be the Asymmetric digital subscriber line (ADSL) in combination with the Internet traffic control protocol/internet protocol (TCP/IP) traffic. There are at least three flow control mechanisms that could be used, i.e. maximising the output from the PC by parameter setting, the TCP end terminal-to-end terminal flow control and a simple link level mechanism. If used, the link level mechanism could look like the following. The network interface 22, e.g. the network terminal NT, measures the filling of the buffer of the relevant type of QoS feeding for instance a VDSL line. If a high level threshold is exceeded, the network terminal NT uses the flow control bit in the GFC field in the downstream cells to tell the terminals to send with reduced speed or to send with increased speed if a low level threshold is underpassed. A sent "0" means that the speed is reduced with the factor "y". A sent "1" means that the speed is increased with the factor "y". If the terminals are transmitting with 100%, more "1:s" will be ignored. If the terminals are transmitting with 0%, more "0:s" will be ignored. A preferred starting value is ¼.

At the MAC and ATM level the terminal adapters and end user services within the terminal adapters are addressed by using parts of the VPI- and VCI fields. At the network level, a terminal must have or be given a world wide unique network address. This could for example be an IPv4-, IPv6-, NSAP- or E. 164 address. The system must create a connection between the network addresses and the home network VP values.

At installation and start up, the terminals are given or expected to have a few MAC related parameters. Firstly, the MAC address which is related to the position in the daisy chain. There are a total of 64 addresses, about 56 individual addresses, one broadcast address and about 7 multicast group addresses. Secondly, the maximum traffic per link. Finally, the maximum constant bit rate that can be used by a terminal, for example 8 Mb/s for a set top box, a set top box performing certain functions in connection with a television set, such as e.g. decoding MPEG signals When a new terminal adapter 100, 101, 102 is plugged into the daisy chain, the terminal adapter detects packets 200 on the incoming ports. As soon as it is locked in on the ATM level, it sends an initialisation packet in both the request direction RD and the answer direction AD. It goes to the nearest neighbours that sends back packets 200 giving their addresses. For example, if a terminal adapter is plugged in between terminal adapters with VPI=3 and VPI=4, the new terminal takes the value 4. It sends a reconfiguration packet to the terminal adapters upstream telling them to increase their VPI values by 1. For example, the former VPI=4 becomes VPI=5. A reconfiguration packet also goes downstreams, informing the terminal adapters that the upstream terminal adapters have new low level addresses. This is done to tell the terminal adapters to start new address resolution processes to tie together their network addresses with the new low level addresses. If a terminal adapter 101, 102 happens to be plugged into the ends of the daisy chain it detects this by locking to packets 200 on one port instead of two. As soon as it has been initialised and informed the other terminals of the new situation, it starts sending packets 200 from its transmit port. The master clock for the whole daisy chain is preferably generated by the terminal with the lowest VPI value. If a network terminal NT 22 is connected to the customer premises network system 11, it will be the master clock and thus also have the lowest address.

The MAC protocol as described above supports the following:

The network topology is a so called daisy chained network, i.e. the bit stream is repeated at every terminal.

Any terminal shall be able to communicate with any other terminal.

The network shall by itself reconfigure whenever a terminal is connected or disconnected.

Moreover, the MAC protocol as described above preferably supports the following additional functions:

The usable bit rate is at least 50 Mb/s. With usable is meant the bit rate that the services can use, that is, Raw bit rate-overhead-MAC protocol inefficiencies.

The network shall be able to carry all ATM quality of service classes; CBR, rt-VBR, nrt-VBR, ABR, and UBR.

It is presumed that the ATM quality service classes can be handled at the MAC layer by two types of services: services with long reservation LTR and services with short reservation STR.

The number of terminal adapters per bus is <64. How many depends on the number of group addresses that are needed.

There is a master function but it is simple so that any terminal can be elected as a master by the others. If a network terminal NT is connected, it is always the master.

All terminals are honest and keep to the rules.

All terminals shall be able to communicate simultaneously.

Traffic from a network interface NT 22 towards the terminal adapters of the home network HN is a dominating one. Traffic between the terminal adapters and traffic towards the network NT 22 is often relatively small.

The protocol is optmised for ATM.

Telephony is carried wit AAL1/47B payload, filled cells.

The low level MAC protocol must admit connections via network signalling.

One skilled in the art will appreciate that the present invention can be practised by other than the described embodiments, which are presented for purposes of illustration, and the present invention is limited only by the claims which follow. It would e.g. possible to use shielded twisted pair cables (STP) or coaxial copper cables instead of the optical fibres as data transmission means. Of course the terminal adapters would have to be adapted accordingly.

SOME ABBREVIATIONS USED IN THE DESCRIPTION

AAL ATM Adaptation Layer
AD Answer Direction
ADSL Asymmetric Digital Subscriber Line
ATM Asynchronous Transfer Mode
B Byte=8 bits.
CBR Constant Bit Rate
CDV Cell Delay Variation
CTD Cell Transfer Delay
GFC Generic Flow Control
HN Home Network
HCS Hard Clad Silica Fibre
LTR Long Time Reservation
MAC Media Access Control
MAN Metropolitan Area Network
MPEG Motion Pictures Experts Group
NT Network Terminal
ONI Optical Network Interface
OPS Optical Protection Switch
POF Plastic Optical Fibre
POTS Plain Old Telephony Service
RD Request Direction
REQ REQuest
STP Shielded Twisted Pair
STR Short Time Reservation
TA Terminal Adapter
VP Virtual Path
VPI Virtual Path Identifier
WAN Wide Area Network

What is claimed is:

1. A method of controlling access of a plurality of terminal adapters to first and second transmission means, the first transmission means interconnecting the terminal adapters to form a daisy chain for transmitting downstream packets and the second transmission means interconnecting the terminal adapters to form a daisy chain for transmitting upstream packets, the first and second transmission means transmitting signals sequentially from terminal adapter to terminal adapter, the signals including a series of packets, each packet including a data field, a request field, and an answer field and being transmitted in a request direction or in an answer direction, the method comprising, at each terminal adapter, the steps of:

determining if an incoming request is for the respective terminal adapter and if the respective terminal adapter has a request to transmit;

keeping track of outgoing capacity of the first and second transmission means as a result of the determining step; and transmitting a request in the request direction or an answer in the answer direction based on the keeping track step.

2. The method of claim 1, wherein each request field includes a request priority status, and the method further comprises, at each terminal adapter having a request to transmit, the steps of:

comparing the request priority status of an incoming request with the request priority status of a request to be transmitted; and storing the incoming request based on the comparing step and transmitting the request to be transmitted.

3. The method of claim 2, wherein the terminal adapter includes a first timer, and the method further comprises, at each terminal adapter having a request to transmit, the steps of:

running the first timer for a predetermined first interval; and at least storing the incoming request at expiry of the first interval.

4. The method of claim 3, wherein each packet further includes a cell, each cell comprising information, a traffic priority status, and an occupancy status, and the method further comprises, at each terminal adapter having information to transmit, the steps of:

determining if an incoming cell is empty;

comparing the traffic priority status of the incoming cell with the traffic priority status of the information to transmit;

storing the information of the incoming cell based on the comparing step; and writing information into the empty cell.

5. The method of claim 4, wherein the terminal adapter includes a second timer, and the method further comprises the steps of running the second timer for a predetermined second interval when having information to transmit, and at least storing the information of the incoming cell at expiry of the second interval.

6. A customer premises network, comprising:

at least two terminal adapters, each terminal adapter being connectable to a respective user terminal;

first transmission means, which interconnects the terminal adapters to form a daisy chain for transmitting downstream information;

second transmission means, which interconnects the terminal adapters to form a daisy chain for transmitting upstream information;

wherein each the terminal adapter further comprises:

means for filtering particular information destined for the respective user terminal from a bit stream transmitted via the first or second transmission means; and means for writing particular information from the respective user terminal into a bit stream transmitted via the first or second transmission means;

wherein the means is adapted to perform the steps of:

determining if an incoming request is for the respective terminal adapter and if the respective terminal adapter has a request to transmit;

keeping track of outgoing capacity of the first and second transmission means as a result of the determining step; and transmitting a request in the request direction or an answer in the answer direction based on the keeping track step.

7. The customer premises network of claim 6, wherein each terminal adapter associated with a user terminal comprises a respective predetermined address value that is related to a position of the terminal adapter in the daisy chain.

8. The customer premises network of claim 7, wherein one of the terminal adapters is a first end terminal adapter and comprises means for generating and forwarding a clock signal to the other terminal adapters via the first transmissions means, the clock signal synchronizing the terminal adapters.

9. The customer premises network of claim 7, wherein one of the terminal adapters is a first end terminal adapter and the means is adapted to receive a clock signal from an access network via the associated user terminal and to forward the clock signal to the other terminal adapters via the first transmissions means, the clock signal synchronizing the terminal adapters.

10. The customer premises network of claim 8, wherein the first end terminal adapter comprises a lowest predetermined address value.

11. The customer premises network of claim 7, wherein one of the terminal adapters is a second end terminal adapter and the means is adapted to the clock signal from the first transmission means to the second transmission means.

12. The customer premises network of claim 7, wherein one of the terminal adapters is a second end terminal adapter and the means is adapted to generate an idle bit stream for transfer via the second transmission means and for extracting the clock signal from the bit stream transferred via the first transferring means and transferring the clock signal to the second transmission means.

13. The customer premises network of claim 11, wherein the second end terminal adapter comprises a highest predetermined address value.

14. The customer premises network of claim 6, wherein the first and second transmission mean s are optical fiber busses.

15. The customer premises network of claim 14, further comprising an optical protection switch for each connection between a terminal adapter and the first transmission means and a terminal adapter and the second transmission means, the optical protection switch bypassing the downstream and upstream bit streams when a terminal adapter is detached therefrom.

16. The customer premises network of claim 14, wherein the terminal adapter further comprises an optical relay for bypassing the optical upstream or downstream bit stream to the respective first and second transmission means in case of power failure of the terminal adapter.

17. The customer premises network of claim 6, wherein the first and second transmission means are one of shielded twisted pair cable and coaxial copper cable.

18. The customer premises network of claim 6, wherein the first and second transmission means transmit information using an asynchronous transfer mode (ATM) protocol and the terminal adapters receive and transmit information using the ATM protocol.

19. The customer premises network of claim 18, wherein the filtering means comprises at least one ATM demultiplexer and the writing means comprises at least one ATM multiplexer.

20. The customer premises network of claim 10, wherein the predetermined address value is a VP address.

21. A customer premises network system, comprising:
a customer premises network of claim 6; and
a user terminal, connected to each respective terminal adapter.

22. The customer premises network system of claim 21, wherein the user terminal connected to the first end terminal adapter is adapted to be connected to an access network and comprises means for receiving and transmitting information from and to the access network.

23. The customer premises network system of claim 22, wherein the clock signal is the clock signal of the access network.

24. The customer premises network system of claim 23, wherein the first end user terminal is a network terminal.

25. The customer premises network system of claim 21, wherein the terminal adapter is integrated within the user terminal.

* * * * *